US009251555B2

(12) United States Patent
Belanger (10) Patent No.: US 9,251,555 B2
(45) Date of Patent: Feb. 2, 2016

(54) TILED VIEWPORT COMPOSITION (75) Inventor: Etienne Belanger, Kanata (CA)

(73) Assignee: 2236008 Ontario, Inc., Waterloo, Ontario (CA)

(*) Notice: Subject to any disclaimer, the term of this patent is extended or adjusted under 35 U.S.C. 154(b) by 859 days.

(21) Appl. No.: 13/492,052

(22) Filed: Jun. 8, 2012

(65) Prior Publication Data
US 2013/0328896 A1 Dec. 12, 2013

(51) Int. Cl.
G09G 5/39 (2006.01)
G06T 1/60 (2006.01)
G09G 5/14 (2006.01)
G09G 5/399 (2006.01)

(52) U.S. Cl.
CPC .. *G06T 1/60* (2013.01); *G09G 5/39* (2013.01); *G09G 5/14* (2013.01); *G09G 5/399* (2013.01); *G09G 2360/122* (2013.01); *G09G 2360/125* (2013.01)

(58) Field of Classification Search
CPC ..... G09G 5/14; G09G 2360/122; G09G 5/39; G06T 1/60
See application file for complete search history.

(56) References Cited

U.S. PATENT DOCUMENTS

| 5,155,822 | A | 10/1992 | Doyle et al. | 395/400 |
| 5,877,762 | A * | 3/1999 | Young | 715/803 |
| 6,396,473 | B1 | 5/2002 | Callahan et al. | 345/113 |
| 6,496,187 | B1 | 12/2002 | Deering et al. | 345/419 |
| 6,501,480 | B1 | 12/2002 | MacInnis et al. | 345/538 |
| 6,573,905 | B1 | 6/2003 | MacInnis et al. | 345/629 |
| 6,597,363 | B1 | 7/2003 | Duluk, Jr. et al. | 345/506 |
| 6,630,945 | B1 | 10/2003 | MacInnis et al. | 345/768 |
| 6,661,423 | B2 | 12/2003 | Lavelle et al. | 345/572 |
| 6,717,576 | B1 | 4/2004 | Duluk, Jr. et al. | 345/419 |
| 6,734,873 | B1 * | 5/2004 | Herf et al. | 345/629 |
| 6,762,762 | B2 | 7/2004 | MacInnis et al. | 345/503 |
| 6,798,421 | B2 | 9/2004 | Baldwin | 345/557 |
| 6,870,538 | B2 | 3/2005 | MacInnis et al. | 345/505 |
| 6,911,983 | B2 | 6/2005 | Sabella et al. | 345/536 |
| 6,971,063 | B1 * | 11/2005 | Rappaport et al. | H04L 41/145 709/203 |
| 7,002,589 | B2 | 2/2006 | Deering | 345/581 |

(Continued)

FOREIGN PATENT DOCUMENTS

EP 0 312 720 A2 4/1989
WO WO 2005/069271 A1 7/2005

OTHER PUBLICATIONS

Viewport, dated Feb. 15, 2012, p. 1, Wikipedia, available at http://en.wikipedia.org/wiki/Viewport.

(Continued)

*Primary Examiner* — James A Thompson
*Assistant Examiner* — Tapas Mazumder
(74) *Attorney, Agent, or Firm* — Brinks Gilson & Lione (57) ABSTRACT A system that buffers an application image reduces bandwidth requirements for accessing memory. The application image may be logically separated into tiles. A viewport may identify a visible portion of the application image, where the visible portion is smaller than the application image. The tiles overlapped by the viewport may be buffered in a front buffer and a back buffer. The tiles not overlapped by the viewport may be buffered in the back buffer but not in the front buffer. A composition manager, with knowledge of the viewport and at least two noncontiguous tile buffers in the front buffer, may extract the visible portion of the application image directly from the noncontiguous tile buffers.

16 Claims, 3 Drawing Sheets

(56) References Cited

U.S. PATENT DOCUMENTS

| | | | |
|---|---|---|---|
| 7,071,944 B2 | 7/2006 | MacInnis et al. | 345/505 |
| 7,079,157 B2 | 7/2006 | Deering | 345/613 |
| 7,167,181 B2 | 1/2007 | Duluk, Jr. et al. | 345/506 |
| 7,215,344 B2 | 5/2007 | Baldwin | 345/620 |
| 7,310,103 B2 | 12/2007 | Patton | 345/620 |
| 7,313,764 B1 | 12/2007 | Brunner et al. | 715/784 |
| 7,505,036 B1 | 3/2009 | Baldwin | 345/421 |
| 7,530,027 B2 | 5/2009 | MacInnis et al. | 715/768 |
| 7,659,900 B2 | 2/2010 | MacInnis et al. | 345/505 |
| 7,808,503 B2 | 10/2010 | Duluk, Jr. et al. | 345/506 |
| 7,907,144 B2 | 3/2011 | Danan | 345/530 |
| 8,078,981 B2 | 12/2011 | MacInnis et al. | 715/768 |
| 2003/0234790 A1* | 12/2003 | Hochmuth et al. | 345/545 |
| 2004/0179019 A1 | 9/2004 | Sabella et al. | |
| 2006/0023953 A1* | 2/2006 | Kliorin et al. | 382/232 |
| 2010/0254603 A1 | 10/2010 | Rivera | 382/173 |
| 2010/0281402 A1 | 11/2010 | Staikos et al. | |
| 2011/0004827 A1 | 1/2011 | Doerr et al. | 715/735 |
| 2011/0148892 A1 | 6/2011 | Shreiner et al. | 345/545 |
| 2012/0256949 A1* | 10/2012 | Treat et al. | 345/629 |

OTHER PUBLICATIONS

Extended European Search Report, dated Nov. 29, 2012, pp. 1-7, European Patent Application No. 12171363.0, European Patent Office, Munich, Germany.

Office Action, dated Mar. 12, 2015, pp. 1-9, European Patent Application No. 12171363.0, European Patent Office, Munich, Germany.

Summons to Attend Oral Proceedings, dated Oct. 26, 2015, pp. 1-11, European Patent Application No. 12171363.0-1904/2672480, European Patent Office, Munich, Germany.

* cited by examiner

TILED VIEWPORT COMPOSITION

BACKGROUND

1. Technical Field

This disclosure relates to graphics and, in particular, to graphics buffers.

2. Related Art

Graphical user interfaces (GUI), Picture in Picture (PiP), and other types of graphical images may be composited from multiple independently rendered images. For example, a GUI may contain a background image and one or more rendered graphic layers on top of the background image. The graphic layers may comprise applications, task bars, or other type of graphic elements. Each of the graphic layers may be rendered in an application buffer independently of the other graphic layers by individual software applications. The graphic layers may be composited together into a single composite image in a display buffer, which may be presented on a display device, transmitted over a network, or otherwise processed. The application buffer may represent an image that is larger than the corresponding graphic layer composited into the single composite image.

BRIEF DESCRIPTION OF THE DRAWINGS

The disclosure may be better understood with reference to the following drawings and description. The components in the figures are not necessarily to scale. Moreover, in the figures, like-referenced numerals designate corresponding parts throughout the different views.

DETAILED DESCRIPTION

A system for buffering an application image may include a composition manager and a memory comprising a front buffer and a back buffer. The application image may be logically divided or separated into tiles. Each of the tiles may identify a corresponding area of the application image. The composition manager may determine which of the tiles are overlapped by a viewport. The viewport may identify a visible portion of the application image. The visible portion may be smaller than the application image. For example, the visible portion may be a portion of a map that is displayed on a display device in a navigation system.

In some systems, the composition manager (or an application that renders the application image) may double buffer (or more generally, multiple buffer) the tiles that the viewport overlaps. The composition manager (or the application) may not double buffer (or multiple buffer) the tiles that the viewport does not overlap. Reducing the amount of memory that is multiple buffered may reduce bandwidth requirements for accessing the memory.

Double buffering may prevent visual tearing artifacts caused when one process writes to a buffer while another process reads from the same buffer. To decrease or avoid the possibility of causing such visual defects, the application may render the application image in the back buffer while another process, such as the composition manager, reads the application image from the front buffer. More generally, a buffer that the system writes to in order to construct a frame of the application image may be the back buffer. A buffer that the system reads the completed frame from may be the front buffer. In examples in which multiple buffering is used, the system may include and use multiple back buffers.

In response to a vertical synchronization pulse or some other event, the front buffer and the back buffer may be switched such that the back buffer becomes the front buffer, and the front buffer becomes the back buffer. The buffer switch may also be referred to as a buffer flip. After the buffer flip, the back buffer may include the contents of frame n, and the front buffer may include the contents of frame n+1. If the entire contents of the front buffer (frame n+1) is copied to the back buffer (frame n), then the back buffer may have the most recent contents (frame n+1), and the application may begin rendering a new frame, n+2 in the back buffer. The process of rendering, flipping, and displaying may be repeated.

However, in the system for buffering the application image, copying the entire contents of the application image from the front buffer to the back buffer may be avoided when the buffer flip occurs. Instead, the composition manager and/or the application may skip double buffering (or multiple buffering) of the tiles that the viewport does not overlap. In particular, the composition manager and/or the application may buffer the tiles that are overlapped by the viewport in both the front and back buffers, and buffer the tiles that are not overlapped by the viewport in the back buffer but not in the front buffer.

Each of the tiles may be buffered in a corresponding tile buffer. The tile buffers may be noncontiguously arranged in memory. Two buffers may be noncontiguous if the buffers are not adjacent to each other in the memory address space of the memory that the buffers are in.

In some systems, the composition manager may copy a buffered visible portion of the application image directly from the noncontiguous tile buffers based on the composition manager having knowledge of the viewport and the tile buffers. The application does not need to create an intermediate buffer that contains the buffered visible portion of application image in contiguous memory so that the composition manager may copy the visible portion from the contiguous memory. Avoiding the creation of the intermediate buffer reduces the bandwidth requirements for accessing memory. The composition manager may generate a composite image from the visible portion of the application image and one or more additional application images.

Figure 1:
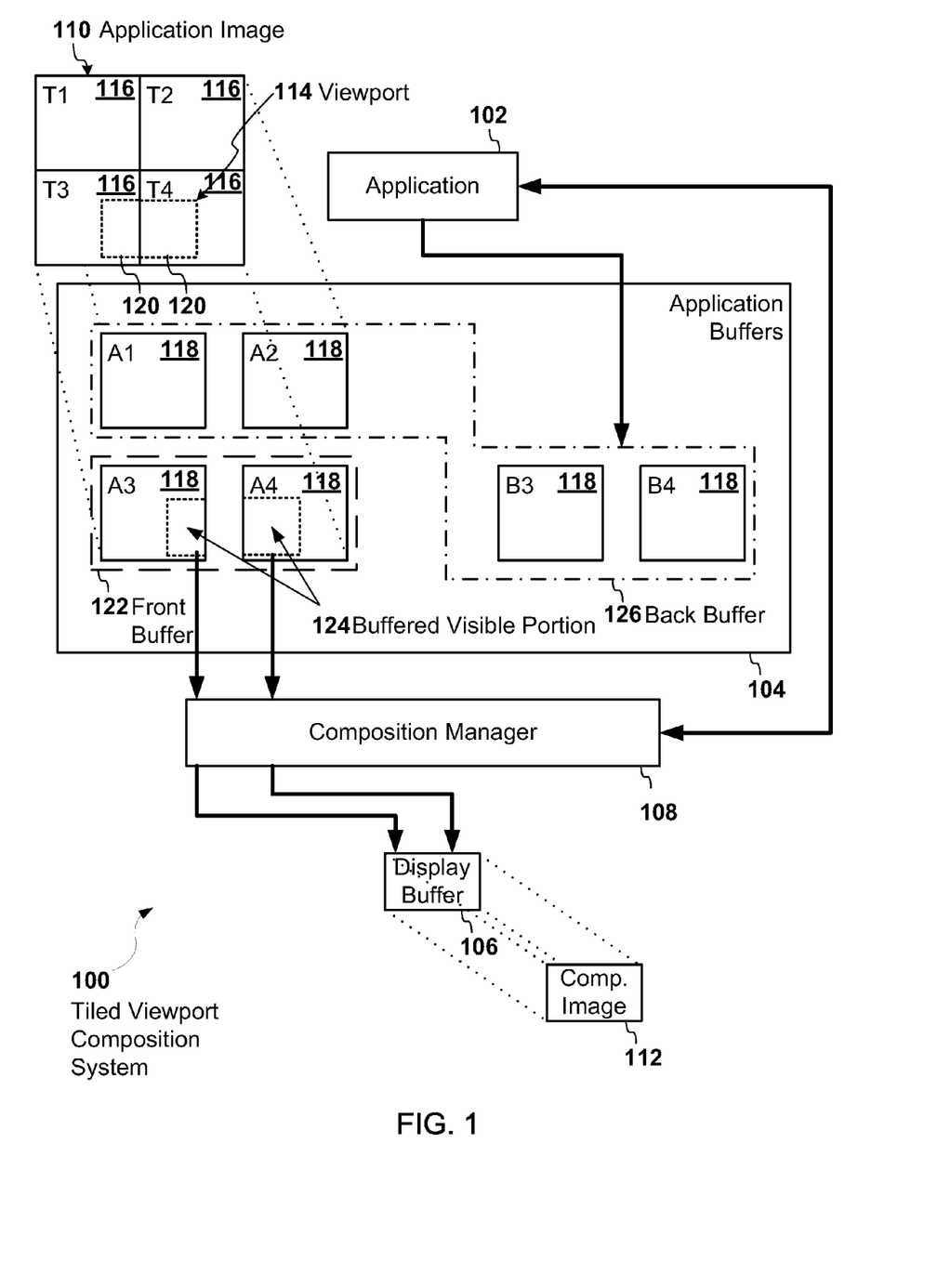
FIG. 1 is a tiled viewport composition system.

FIG. 1 illustrates a tiled viewport composition system 100. The system 100 may include an application 102, application buffers 104, a display buffer 106, and a composition manager 108. The tiled viewport composition system 100 is a system for buffering an application image 110.

The application 102 may render the application image 110. The application image 110 may include a window generated by a windows based operating system, such an operating system for a mobile electronic device, a desktop computer, or a server. Examples of the windows based operating system may include MICROSOFT WINDOWS®, which is a registered trademark of Microsoft Corporation of Redmond, Wash.; LINUX®, which is a registered trademark of Linus Torvalds of Finland; and ANDROID™, which is a trademark of Google, Inc. of Mountain View, Calif. Alternatively or in addition, the application image 110 may include a Graphical User Interface (GUI), a Picture in Picture (PiP), a task bar, a background picture, a frame in a sequence of frames that may be part of a video, or any other type of digital image. Examples of the application 102 may include a word processing program, a mail program, a web browser, a mobile application, or other types of software program or hardware component that may render the application image 110.

The application buffers 104 may be one or more areas of memory that represent the application image 110 and/or portions thereof. The memory may include contiguous and/or noncontiguous areas of memory.

The display buffer 106 may comprise an area of memory that represents a composite image 112 assembled from individual images generated by one or more applications, such as the application 102 illustrated in FIG. 1. The composite image 112 may be presented on a display device, transmitted over a network, or locally or remotely processed.

The composition manager 108 may composite or direct the composition of the individual images into the composite image 112. The individual images may include all or a portion of application images. Examples of the composition manager 108 include a hardware compositor, a window manager, or any other component that composites individual images into the composite image 112.

During operation of the tiled viewport composition system 100, the composition manager 108 may render the composite image 112 from a visible portion of the application image 110 identified by a viewport 114. The visible portion identified by the viewport 114 may be smaller than the entire application image 110. The composition manager 108 may render the composite image 112 from the visible portion of the application image 110 and from one or more additional images.

The application 102 may move the viewport 114 around the application image 110 as the visible portion of the application image 110 changes over time. In one example, the application image 110 may be a map image, and the viewport 114 identifies the portion of the map image that is to be displayed in a navigation system. As the location of the navigation system changes, the portion of the map image displayed in the navigation system may also change. In a second example, the application image 110 may be an image of a level in a video game, and the viewport 114 may identify the portion of an image of the level that is to be displayed on a screen. As a game character moves around the level, the portion of the image of the level displayed on the screen changes. In a third example, a webpage viewer may render more content than may be shown on the display. The composite image 112 may update more quickly, or produce a visibly smoother transition appearance, when the application 102 uses the viewport 114 to update the visible portion of the application image 110.

The application 102 may logically divide or partition the application image 110 into tiles 116. Each of the tiles 116 may identify a corresponding area of the application image 110. The tiles 116 may be uniform in size and shape throughout the application image 110. Alternatively, the size and the shape of the tiles 116 may vary throughout the application image 110. The size and shape of the tiles 116 may be different in different examples.

The tiles 116 may be represented in corresponding tile buffers 118. For example, the tiles 116 that are individually designated T1-T4 in FIG. 1 may be represented in the tile buffers 118 that are individually designated A1-A4. The tile buffers 118 may be included in the application buffers 104.

The composition manager 108 may determine which of the tiles 116 are overlapped by the viewport 114. Each of the tiles 116 that are overlapped or intersected by the viewport 114 may contain at least part 120 of the visible portion of the application image 110. In contrast, the tiles 116 that are not overlapped by the viewport 114 may not contain any visible part 120 of the application image 110.

The composition manager 108 may double buffer the tiles 116 that are overlapped by the viewport 114, but not the remaining tiles 116. A front buffer 122 may include the tile buffers 118 (A3 and A4) representing the tiles 116, (T3 and T4) overlapped by the viewport 114. Accordingly, the tile buffers 118 (A3 and A4) in the front buffer 122 include a buffered visible portion 124 of the application image 110. Conversely, a back buffer 126 may include the tile buffers 118 (A1 and A2) representing the tiles 116 (T1 and T2) not overlapped by the viewport 114. In addition, the back buffer 126 may include the tile buffers 118 (B3 and B4) that correspond to the tile buffers 118 (A3 and A4) that are in the front buffer 122 and that represent the tiles 116 overlapped by the viewport 114.

When generating the composite image 112, the composition manager 108 may extract the buffered visible portion 124 of the application image 110 from the tile buffers 118 (A3 and A4) that are in the front buffer 122. The buffered visible portion 124 may be of frame n of the application image 110. The application 102 may render frame n+1 of the application image 110 in the back buffer 126 by modifying the tile buffers 118 (A1, A2, B3, and B4) that are in the back buffer 126.

When a buffer flip occurs, the composition manager 108 may copy the contents of a subset of the tile buffers 118 that are in the back buffer 126 to the front buffer 122. The subset of the tile buffers 118 may be the tile buffers 118 (B3 and B4) that correspond to the tile buffers 118 (A3 and A4) that are in the front buffer 122. The composition manager 108 may skip copying tile buffers 118 (A1 and A2) representing the tiles 116 (T1 and T2) not overlapped by the viewport 114 to the front buffer 122.

Alternatively or in addition to copying the contents of the subset of the tile buffers 118 from the back buffer 126 to the front buffer 122 when the buffer flip occurs, the composition manager 108 may change an association between the tile buffers 118 and the front and back buffers 122 and 126. The composition manager 108 may track, in a data structure, which of the tile buffers 118 are associated with the front buffer 122, and which of the tile buffers 118 are associated with the back buffer 126. The associations between the tile buffers 118 and the front and back buffers 122 and 126 indicate which of the tile buffers 118 are included in each of the front and back buffers 122 and 126. When the buffer flip occurs, the composition manager 108 may disassociate the subset of the tile buffers 118 (B3 and B4) from the back buffer 126, and associate the subset of the tile buffers 118 (B3 and B4) with the front buffer 122. Correspondingly, the composition manager 108 may change the tile buffers 118 (A3 and A4) that were originally associated with the front buffer 122 to be associated with the back buffer 126. In other words, the composition manager 108, in response to the buffer flip, may swap a first set of the tile buffers 118 associated with the front buffer 122 with a second set of the tile buffers 118 associated with the back buffer 126, where the tile buffers 118 that are swapped represent the tiles 116 that the viewport 114 overlaps but not the tiles 116 that the viewport 114 does not overlap.

When the composition manager 108 swaps the tile buffers 118 that are associated with the front buffer 122 with the corresponding tile buffers 118 that are associated with the back buffer 126, then the tile buffers 118 swapped into the back buffer 126 may represent an older frame, such as frame n. The tile buffers 118 swapped into the front buffer 126 may represent frame n+1. After the buffer swap, the application 102 may render a third frame, such as frame n+2, in the back buffer 126.

When the viewport 114 moves and overlaps a new one of the tiles 116, the composition manager 108 may double buffer the newly overlapped tile 116. Conversely, when the viewport 114 moves and no longer overlaps one of the tiles 116, then the composition manager 108 may stop double buffering the previously overlapped tile 116.

Accordingly, when the viewport 114 moves, the composition manager 108 may adjust which of the tile buffers 118 are in the front buffer 122 so that the tile buffers 118 in the front buffer 122 correspond to the tiles 116 overlapped by the viewport 114. Similarly, when the viewport 114 moves, the composition manager 108 may adjust which of the tile buffers 118 are in the back buffer 126.

When the viewport 114 moves and overlaps a newly overlapped tile 116, then the tile buffer 118 in the back buffer 126 that corresponds to the newly overlapped tile 116 may be included in the front buffer 122. The tile buffer 118 added to the front buffer does not need to be completely re-rendered because the application 102 may have already rendered the tile buffer 118 in the back buffer 126.

In some systems, the tile buffers 118 may be dynamically allocated and freed as the viewport 114 moves. For example, if the viewport 114 moves and overlaps four of the tiles 116 (T1-T4) illustrated in FIG. 1 instead of two of the tiles 116 (T3 and T4), then the composition manager 108 may dynamically allocate two tile buffers 118 (B1 and B2, which are not shown in FIG. 1). The front buffer 122 may then include four of the tile buffers 118 (A1-A4), and the back buffer 126 may include the four corresponding tile buffers 118 (B1-B4).

As an alternative to dynamically allocating the tile buffers 118, the tile buffers 118 may be allocated in advance. For example, upon an initialization requested by the application 102, the composition manager 108 may allocate enough of the tile buffers 118 to fully represent the application image 110 in both the back buffer 126 and the front buffer 122. The composition manager 108 may dynamically associate the pre-allocated tile buffers 118 to the front and back buffers 122 and 126.

The application 102 and the composition manager 108 may have different features than those described. In one system, the composition manager 108 (instead of the application 102) may divide or partition the application image 110 into tiles 116. The application 102 may invoke an API (Application Programming Interface) to indicate to the composition manager 108 the size of the application image 110. In response, the composition manager 108 may divide the application image 110 into the tiles 116 and allocate the corresponding tile buffers 118. In another system, the application 102 (instead of the composition manager 108) may double buffer the tiles 116 that are overlapped by the viewport 114, but not the remaining tiles 116. In still another system, one or more components other than the application 102 and the composition manager 108 may execute described functions of the application 102 and the composition manager 108.

The composition manager 108 may render the composite image 112 from the visible portion of the application image 110 identified by the viewport 114. The composition manager 108, having knowledge of the tile buffers 118 and the viewport 114, may copy the buffered visible portion 124 directly from the tile buffers 118 in the front buffer 122 to the display buffer 106 even if the buffered visible portion 124 is spread across multiple noncontiguous tile buffers 118. Copying the buffered visible portion 124 from the tile buffers 118 in the front buffer to an intermediate buffer, and then copying from the intermediate buffer to the display buffer 106 may be unnecessary. The application 102, for example, may provide the composition manager 108 with information about the viewport 114 and about the tile buffers 118 in the front buffer 122. The composition manager 108 may use the information provided by the application 102 to copy the buffered visible portion 124 from the tile buffers 118 in the front buffer 122 to the display buffer 106. Alternatively, the composition manager 108 may render the composite image 112 from an intermediate buffer. The intermediate buffer may be populated by the application 102 by copying from the buffered visible portion 124 in the front buffer 122.

The frame of the application image 110 represented in the front buffer 122 may be frame n or any other frame. The frame of the application image 110 represented in the back buffer 126 may be frame n+1 or any other frame.

As described, the composition manager 108, the application 102, and/or some other component may double buffer the tiles 116 that are overlapped or lie or extend and cover part of by the viewport 114. The composition manager 108 and/or the application 102 may apply multiple buffering to the tiles 116 that are overlapped by the viewport 114, and not to the tiles 116 that are not overlapped by the viewport 114. Multiple buffering may include double buffering, triple buffering, or other buffering processes and/or hardware that includes storing one or more frames of the application image 110 in one or more front buffers for extraction of the application image 110, and storing one or more frames of the application image 110 in one or more back buffers for rendering of the application image 110.

Figure 2:
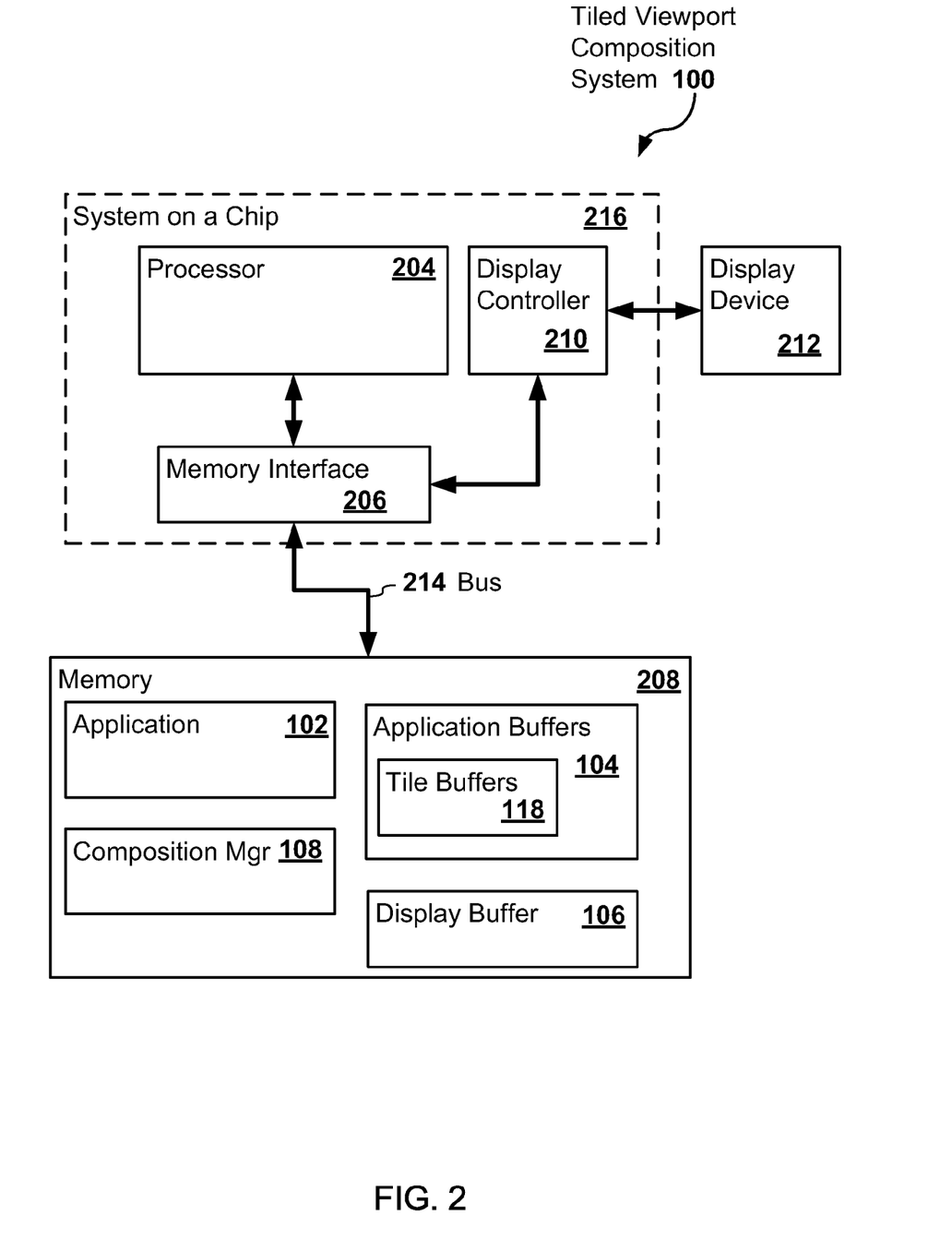
FIG. 2 is a hardware diagram of a tiled viewport composition system.

FIG. 2 is a hardware diagram of the tiled viewport composition system 100. The tiled viewport composition system 100 may include a processor 204, a memory interface 206, and a memory 208. The tiled viewport composition system 100 may be referred to simply as the system 100.

The processor 204 may be hardware that executes computer executable instructions or computer code embodied in the memory 208 or in other memory to perform one or more features of the tiled viewport composition system 100. The processor 204 may include a general processor, a central processing unit, a graphics processing unit, an application specific integrated circuit (ASIC), a digital signal processor, a field programmable gate array (FPGA), a digital circuit, an analog circuit, a microcontroller, any other type of processor, or any combination thereof.

The memory interface 206 may manage the transportation of data going to and from the memory 208, such as between the processor 204 and the memory 208. The memory interface 206 may include any memory controller, such as a Memory Chip Controller (MCC), a Double Data Rate2 (DDR2) memory controller used to drive DDR2 SDRAM (double data rate synchronous dynamic random-access memory), a Peripheral Component Interconnect (PCI) bus controller, or any other type of memory controller. The memory interface 206 may communicate with the memory 208 over a bus 214, such as a 64 bit DDR2 bus operating at 400 Megahertz or any other type of bus.

The memory 208 may comprise a device for storing and retrieving data or any combination thereof. The memory 208 may include non-volatile and/or volatile memory, such as a random access memory (RAM), a read-only memory (ROM), an erasable programmable read-only memory (EPROM), or a flash memory. Alternatively or in addition, the memory 208 may include an optical, magnetic (hard-drive) or any other form of data storage device.

The memory 208 may store computer code, such as the composition manager 108, the application 102, and/or any other application. The computer code may include instructions executable with the processor 204. The computer code may be written in any computer language, such as C, C++, assembly language, shader code, channel program code, and/or any combination of computer languages.

The memory 208 may include buffers, such as the application buffers 104 and the display buffer 106. The application buffers 104 may include the tile buffers 118.

All of the disclosure, regardless of the particular implementation described, is exemplary in nature, rather than limiting. The system 100 may include more, fewer, or different components than illustrated in FIGS. 1 and 2. For example, the system 100 may also include a display controller 210 and a display device 212. The display controller 210 may read the composite image 112 from the display buffer 106 through the memory interface 206 and cause the composite image 112 to be displayed in the display device 212.

The processor 204 may be in communication with the memory 208 via the memory interface 206. The processor 204 may be in communication with other components, such as the display controller 210 and/or a network controller (not shown).

Furthermore, each one of the components of system 100 may include more, fewer, or different elements than is illustrated in FIGS. 1 and 2. For example, the memory 208 may include more, fewer, or different modules, graphics buffers, and applications. Moreover, the application 102 and/or the composition manager 108 may include various modules. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

In some examples, one or more of the components of the system 100 may be included in a System on a Chip (SOC) 216. For example, the SOC 216 may include the processor 204, the memory interface 206 and the display controller 210. In another example, the SOC 216 may include additional components, such as memory.

The system 100 may be implemented in many processes and/or systems. For example, although some features are shown stored in computer-readable memories as logic implemented as computer-executable instructions or as data structures in memory, portions of the system 100 and its logic and data structures may be stored on, distributed across, or read from any other machine-readable storage media. Examples of the storage media may include memories, a cache, a buffer, RAM, a removable media, a hard drive, a hard disk, a floppy disk, a CD-ROM, or any other type of machine-readable or computer-readable storage medium. The media may include any non-transitory computer-readable storage media, such as volatile or non-volatile memory, RAM, ROM, CD-ROM, any other suitable storage device or any combination thereof. Alternatively or in addition, features and/or modules described as logic implemented as computer-executable instructions or as data structures in memory may be implemented in hardware or in a combination of hardware and software, such as in a field programmable gate array (FPGA).

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer, central processing unit ("CPU"), graphics processing unit ("GPU"), or system.

The processing capability of the system 100 may be distributed among multiple entities, such as among multiple processors and memories, optionally including multiple distributed processing systems. Parameters and other data structures may be separately stored and managed, may be incorporated into a single memory or database, may be logically and physically organized in many different ways, and may be implemented with different types of data structures such as linked lists, hash tables, or implicit storage mechanisms. Logic, such as programs or circuitry, may be combined or split among multiple programs, distributed across several memories and processors.

Figure 3:
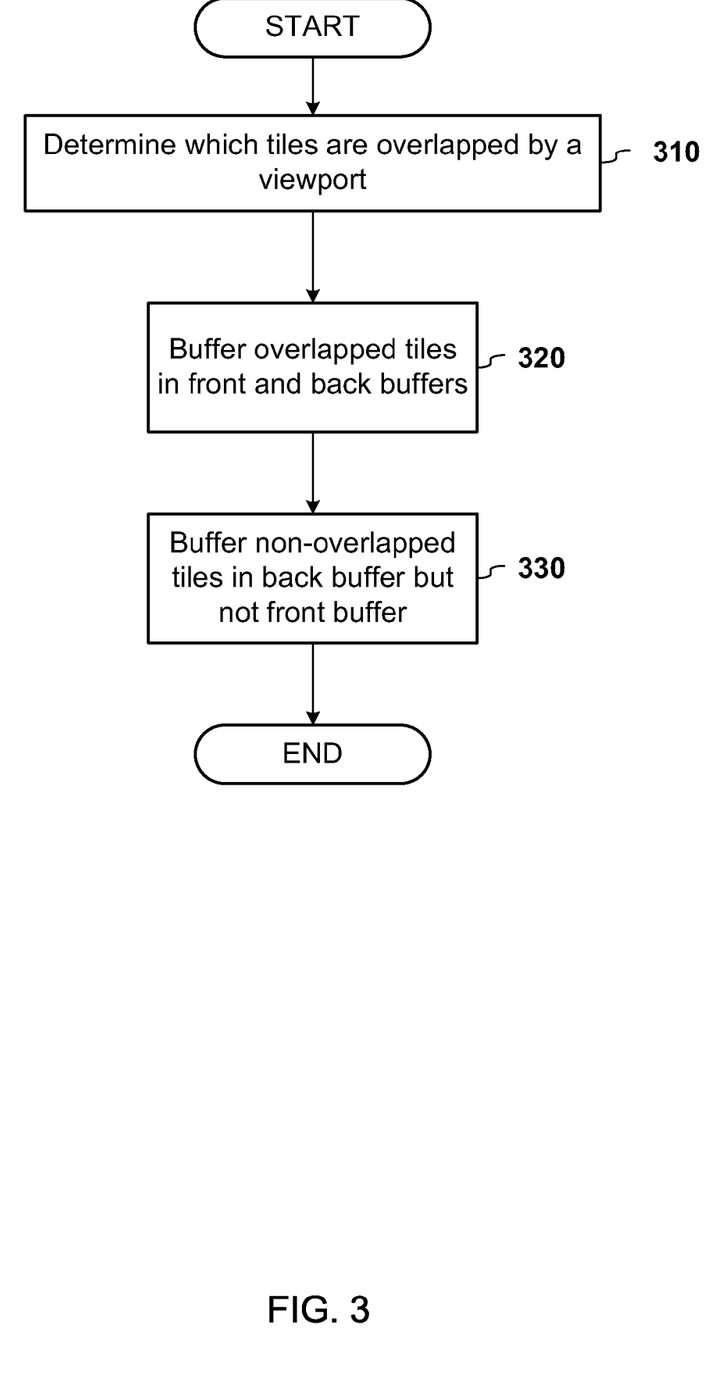
FIG. 3 is a flow diagram of the logic of a tiled viewport composition system.

FIG. 3 is a flow diagram of the logic of the tiled viewport composition system 100. The application image 110 may be provided as logically divided into the tiles 116. For example, the tile buffers 118 may be in the memory 208 and represent the tiles 116.

The logic may determine (310) which of the tiles 116 are overlapped by the viewport 114. The viewport 114 may identify the visible portion of the application image 110, and the visible portion may be smaller than the application image 110.

The tiles 116 that are overlapped by the viewport 114 may be buffered (320) in the front buffer 122 and the back buffer 126, where the visible portion of the application image 110 is extracted from the front buffer 122, and the application image 110 is modified in the back buffer 126. For example, the front buffer 122 may buffer frame n, and the back buffer 126 may buffer frame n+1.

The tiles 116 not overlapped by the viewport 114 may be buffered (330) in the back buffer 126 in which the application image 119 is modified but not in the front buffer 122 from which the visible portion of the application image 110 is extracted. The logic may end, for example, by the composition manager 108 extracting the buffered visible portion 124 of the application image 110 from the front buffer 122.

The logic may include additional, different, or fewer operations. In one such example, the logic may include dividing the application image 110 into the tiles 116 by allocating the tile buffers 118. The operations may be executed in a different order than illustrated in FIG. 3.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments have been described, it will be apparent to those of ordinary skill in the art that many more embodiments and implementations are possible within the scope of the disclosure. Accordingly, the disclosure is not to be restricted except in light of the attached claims and their equivalents.

What is claimed is:

1. A computer implemented method of buffering an application image comprising:
   providing the application image separated into a plurality of tiles;
   determining which of the tiles are overlapped by a viewport, wherein the viewport identifies a visible portion of the application image, and the visible portion is smaller than the application image;
   buffering the tiles overlapped by the viewport in a front buffer and a back buffer, wherein the visible portion of the application image is extracted from the front buffer, the application image is modified in the back buffer, and the front buffer and the back buffer are in a computer-readable memory; and
   buffering the tiles not overlapped by the viewport in the back buffer in which the application image is modified but not in the front buffer from which the visible portion of the application image is extracted even when the front buffer and the back buffer are flipped in a buffer flip.

2. The computer implemented method of claim 1, further comprising reading, with a composition manager having knowledge of the viewport and at least two noncontiguous tile buffers in the front buffer, a buffered visible portion of the application image directly from the at least two noncontiguous tile buffers.

3. The computer implemented method of claim 1 further comprising adjusting which of a plurality of tile buffers are in the front buffer when the viewport moves such that the tile buffers that are in the front buffer correspond to the tiles overlapped by the viewport but not to the tiles not overlapped by the viewport.

4. The computer implemented method of claim 1 further comprising copying, in response to the buffer flip, a first set of tile buffers in the back buffer to a second set of tile buffers in the front buffer, wherein the tile buffers that are copied represent the tiles overlapped by the viewport but not the tiles not overlapped by the viewport.

5. The computer implemented method of claim 1 further comprising swapping, in response to the buffer flip, a first set of tile buffers associated with the front buffer with a second set of tile buffers associated with the back buffer, wherein the tile buffers that are swapped represent the tiles overlapped by the viewport but not the tiles not overlapped by the viewport.

6. A system for buffering a first application image, the system comprising:
   a processor; and
   a memory comprising:
   a front buffer;
   a back buffer; and
   a composition manager configured to determine which of a plurality of tiles intersect a viewport, wherein each of the tiles identifies a corresponding area of the first application image, the viewport identifies a visible portion of the first application image, and the visible portion is smaller than the first application image,
   wherein the composition manager is further configured to buffer, in the front buffer and the back buffer, the tiles that intersect the viewport, wherein the composition manager extracts the visible portion of the first application image from the front buffer, and the first application image is rendered in the back buffer,
   wherein the composition manager is further configured to buffer the tiles that are not intersected by the viewport in the back buffer in which the first application image is rendered but not in the front buffer from which the visible portion of the first application image is extracted even after the front buffer and the back buffer are flipped in a buffer flip, and
   wherein the composition manager is further configured to generate a composite image from the visible portion of the first application image and a second application image.

7. The system of claim 6, wherein the composition manager is further configured to determine that at least two noncontiguous tile buffers in the front buffer intersect the viewport, and the composition manager is further configured to extract the visible portion of the first application image directly from the at least two noncontiguous tile buffers.

8. The system of claim 6 wherein the composition manager is further configured to divide the application image into the tiles in response to a request by an application.

9. The system of claim 6 wherein all of a plurality of tile buffers copied from the back buffer to the front buffer in response to the buffer flip represent only the tiles that intersect the viewport.

10. The system of claim 6 wherein all of a plurality of tile buffers swapped between the front buffer and the back buffer in response to the buffer flip represent only the tiles that intersect the viewport.

11. A non-transitory computer-readable storage medium encoded with computer executable instructions, the computer executable instructions executable with a processor to buffer an application image, the computer-readable storage medium comprising:
   instructions executable to separate the application image into a plurality of tiles;
   instructions executable to determine which of the tiles are overlapped by a viewport, wherein the viewport identifies a visible portion of the application image, and the visible portion is smaller than the application image;
   instructions executable to buffer the tiles overlapped by the viewport in a front buffer and a back buffer, wherein the visible portion of the application image is extracted from the front buffer, the application image is modified in the back buffer; and instructions executable to buffer the tiles not overlapped by the viewport in the back buffer in which the application image is modified but not in the front buffer from which the visible portion of the application image is extracted even after the front buffer is switched with the back buffer in a buffer flip.

12. The computer-readable storage medium of claim 11, wherein tiles overlapped by the viewport are double buffered with the front buffer and the back buffer, and the tiles not overlapped by the viewport are not double buffered.

13. The computer-readable storage medium of claim 11, wherein the tiles overlapped by the viewport are multiple buffered with the front buffer and a plurality back buffers that include the back buffer, and wherein the tiles not overlapped by the viewport are not multiple buffered.

14. The computer-readable storage medium of claim 11 further comprising instructions executable to associate a tile buffer that is in the back buffer with the front buffer in response to a movement of the viewport, wherein the tile buffer represents a tile overlapped by the viewport after the movement of the viewport but not before the movement of the viewport.

15. The computer-readable storage medium of claim 14 further comprising instructions executable to copy the contents of the tile buffer between the front buffer and the back buffer in response to the movement of the viewport.

16. A system for buffering a first application image, the system comprising:
- a processor; and
- a memory comprising:
- a front buffer;
- a back buffer;
- a composition manager; and
- an application configured to determine which of a plurality of tiles intersect a viewport, wherein each of the tiles identifies a corresponding area of the first application image, the viewport identifies a visible portion of the first application image, and the visible portion is smaller than the first application image,
- wherein the application is further configured to buffer, in the front buffer and the back buffer, the tiles that intersect the viewport, wherein the composition manager extracts the visible portion of the first application image from the front buffer, and the application renders the first application image in the back buffer,
- wherein the application is further configured to buffer the tiles that are not intersected by the viewport in the back buffer in which the first application image is rendered but not in the front buffer from which the visible portion of the first application image is extracted regardless of whether the back buffer and the front buffer are flipped in a buffer flip, and
- wherein the composition manager is configured to generate a composite image from the visible portion of the first application image and a second application image.

* * * * *